United States Patent
Weaver, Jr.

(10) Patent No.: US 7,151,927 B1
(45) Date of Patent: Dec. 19, 2006

(54) QUALITY OF PHONE SERVICE SYSTEM

(75) Inventor: Lindsay A. Weaver, Jr., Boulder, CO (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/157,906

(22) Filed: Sep. 21, 1998

(51) Int. Cl.
*H04Q 7/20* (2006.01)
*H04B 17/00* (2006.01)

(52) U.S. Cl. .................. 455/423; 455/67.1; 455/67.7

(58) Field of Classification Search ............... 455/423, 455/424, 67.1, 67.4, 67.7; 379/27, 32, 29, 379/1, 30
See application file for complete search history.

(56) References Cited

U.S. PATENT DOCUMENTS

| | | | | |
|---|---|---|---|---|
| 4,554,410 A | * | 11/1985 | Furumoto | 379/127 |
| 5,134,643 A | * | 7/1992 | Iwata | 455/423 |
| 5,361,402 A | * | 11/1994 | Grube et al. | 455/67.1 |
| 5,425,076 A | * | 6/1995 | Knippelmeir | 379/27 |
| 5,471,146 A | * | 11/1995 | Krayeski et al. | 324/637 |
| 5,471,649 A | * | 11/1995 | Rees et al. | 455/67.4 |
| 5,481,588 A | * | 1/1996 | Rickli et al. | 379/32 |
| 5,542,120 A | * | 7/1996 | Smith et al. | 455/425 |
| 5,572,510 A | * | 11/1996 | Koivu | 370/252 |
| 5,754,560 A | * | 5/1998 | Nousiainen et al. | 714/716 |
| 5,768,688 A | * | 6/1998 | Owada | 455/67.1 |
| 5,768,689 A | * | 6/1998 | Borg | 455/67.4 |
| 5,784,406 A | * | 7/1998 | DeJaco et al. | 375/224 |
| 5,784,695 A | * | 7/1998 | Upton et al. | 455/442 |
| 5,805,666 A | * | 9/1998 | Ishizuka et al. | 379/1.01 |
| 5,875,397 A | * | 2/1999 | Sasin et al. | 455/423 |
| 5,875,398 A | * | 2/1999 | Snapp | 455/424 |
| 5,913,162 A | * | 6/1999 | Gourdin et al. | 455/424 |
| 5,930,707 A | * | 7/1999 | Vambaris et al. | 455/424 |
| 5,943,617 A | * | 8/1999 | Nakamura | 455/423 |
| 5,946,633 A | * | 8/1999 | McAlinden | 370/468 |
| 6,151,482 A | * | 11/2000 | Eriksson | 455/67.1 |
| 6,219,543 B1 | * | 4/2001 | Myers et al. | 455/423 |
| 6,339,698 B1 | * | 1/2002 | Cullen | 455/67.1 |

FOREIGN PATENT DOCUMENTS

| | | | |
|---|---|---|---|
| EP | 837615 A | | 4/1998 |
| WO | WO 97/22215 | * | 6/1997 |

OTHER PUBLICATIONS

Pfitzmann, D., et al. "Die Testmobilstation (TMS) ein Mess—und Testgerat fur das GSM–System", ITG Fachberichte, VDE Verlag, Berlin, DE, No. 124, Sep. 27, 1993, p. 467–476 XP000576901 ISSN: 0341–0196.

* cited by examiner

*Primary Examiner*—Charles N. Appiah
(74) *Attorney, Agent, or Firm*—Philip Wadsworth; Charles Brown; Bruce Greenhaus (57) ABSTRACT

A method for checking the quality of service provided by a base station at a location remote from the base station, including transmitting signals between the base station and a call transceiver at the remote location, analyzing at least some of the signals at the remote location to formulate at least one parameter indicating the quality of the signals, and transmitting the at least one parameter from a control transceiver at the remote location to the base station.

18 Claims, 11 Drawing Sheets

QUALITY OF PHONE SERVICE SYSTEM

FIELD OF THE INVENTION

The present invention relates generally to performance testing of communications systems, and specifically to checking the quality of cellular telephone systems.

BACKGROUND OF THE INVENTION

Cellular telephone systems operating in a given region comprise a number of base station transceiver subsystems (BTSs) which are capable of receiving signals from, and transmitting signals to, portable telephones in the region. The quality of the service (QoS) provided is an important aspect of the system, and, accordingly, system operators require measurements of the quality of service provided by each of the base stations. U.S. Pat. No. 5,490,204, to Gulledge, which is incorporated herein by reference, describes an automated quality assessment system for cellular networks. The system uses a mobile station, comprising a laptop computer coupled to a station system controller and a cellular telephone, to check the quality of service provided by a base station.

Airlink Communications, Inc., of San Jose, Calif., produces a field diagnostic and measurement tool, called an Airlink CDPD (Cellular Digital Packet Data) Cell Wizard. The tool comprises a laptop computer coupled to a CDPD modem and a global positioning system (GPS) receiver, enabling an operator to identify problems at a known position in a network. Ameritec Corporation, of Covina, Calif., produces a problem identification system called SWARM. The system comprises a master unit coupled to a base station, and a number of mobile responders, which are operated remotely by the master unit. Each responder comprises a cellular telephone and controlling circuitry The master unit originates and terminates calls to the responders, and is able to measure audio quality using a multiple-tone testing method. The responders perform network parametric tests, and results are uploaded to the master unit.

SUMMARY OF THE INVENTION

It is an object of some aspects of the present invention to provide methods and apparatus for improved checking of the quality of service provided by a base station transceiver subsystems in a cellular telephone system.

It is another object of some aspects of the present invention to provide methods and apparatus for substantially simultaneous transmission of calls and analysis of the quality of the calls.

It is a further object of some aspects of the present invention to provide improved methods and apparatus for checking the quality of service provided by a code division multiple access telephone system.

In preferred embodiments of the present invention, a quality of service (QoS) checker unit comprises two transceivers, most preferably cellular telephones, mounted in a weatherproof enclosure. The unit is located in a region within contact of but remote from a base station, and operates as a quality of service checker unit for the base station. The unit may be attached to a fixed object, such as a pole or a wall or mode in a mobile vehicle.

One of the two transceivers, herein termed the call transceiver, is used to receive call signals and return call signals via the base station. The call signals may be call signals directed to the transceiver, or other radiofrequency signals which are received by the call transceiver The QoS unit comprises a controller, which performs measurements on the call signals received and/or returned, and based on the measurements calculates parameters indicative of the quality of service (QoS) of the transmissions from the base station. The other transceiver, herein termed the control transceiver, is used independently of the call transceiver to transmit data signals comprising the QoS parameters for further analysis. The control transceiver may transmit data at substantially the same time as the call receiver is receiving, or at some later time. The control transceiver is also used to receive data signals, for example data comprising control information for the call transceiver and/or instructions regarding the measurements to be performed, transmitted via the base station In some preferred embodiments of the present invention, call signals and/or data transfer are initiated by a testing facility, remote from the base station and the unit. Alternatively, the call signals and/or data transfer are initiated by the unit, for transmission to the testing facility. Preferably, the testing facility communicates with the unit via the base station using an industry-standard protocol. Most preferably, the testing facility comprises a dedicated server which is able to communicate with a user-using an industry-standard browser via an industry-standard network such as the Internet.

In some preferred embodiments of the present invention, control software is loaded into the controller to enable the unit to operate substantially independently and automatically. Most preferably, the control software comprises instructions for the unit to initiate and receive call signals, to analyze call signals, and to store results of the analysis in a memory contained in the unit. The control software may be updated via an external connector on the unit, or over the air (OTA) via the control transceiver. While software is being updated, the unit is able to continue initiating, receiving, and analyzing call signals, via the call transceiver, according to previously installed software. It will be appreciated that the use of two transceivers in a unit, one for call signals and one for data transfer, significantly improves the flexibility and real-time operation of the system, compared to systems at present known in the art using a single transceiver.

In Some preferred embodiments of the present invention, the calls placed are "looped-back" automatically, i.e., the calls and/or analyzed data from the calls are automatically returned to an originator of the call. Comparison of the original call with the returned call or analyzed data enables a quality of service measure to be made for the call.

In some preferred embodiments of the present invention, the calls initiated or received are in the form of digital signals, and the digital signals are analyzed to measure the QoS. Cellular telephone transmissions are typically in the form of spread frequency spectrum transmissions, such as code division multiple access (CDMA), wherein analysis of network behavior is difficult. Use of digital signal transmission and analysis when the network is operating with one of these types of spread-spectrum transmission significantly enhances the overall network analysis capability of the present invention.

In some preferred embodiments of the present invention, calls between the checker unit and the base station are initiated by the base station and terminate at the unit, or vice versa.

In some preferred embodiments of the present invention, calls are placed between the call transceiver and the control transceiver via the base station, and the calls are analyzed.

In some preferred embodiments of the present invention, a plurality of QoS checker units are located within contact of but remote from a plurality of base stations, and are operated and controlled by a testing facility.

There is therefore provided, in accordance with a preferred embodiment of the present invention, a method for checking the quality of service provided by a base station at a location remote from the base station, including:

transmitting signals between the base station and a call transceiver at the remote location;

analyzing at least some of the signals at the remote location to formulate at least one parameter indicating the quality of the signals; and transmitting the at least one parameter from a control transceiver at the remote location to the base station.

Preferably, transmitting the signals includes transmitting call signals to the transceiver and returning the call signals from the transceiver.

Preferably, transmitting the signals includes transmitting digital signals.

Preferably, the method includes transmitting control signals to the control transceiver, and wherein transmitting signals between the base station and the call transceiver includes transmitting the signals responsive to the control signals.

Alternatively, transmitting control signals includes downloading control software to the control transceiver.

Preferably, transmitting the signals includes initiating signals from a testing facility which is remote from the base station and the remote location.

Alternatively, initiating the signals includes receiving signals at the testing facility.

There is further provided, in accordance with a preferred embodiment of the present invention, a method for checking the quality of service provided by a base station at a location remote from the base station, including:

transmitting control signals to a control transceiver at the remote location;

transmitting call signals between the base station and a call transceiver at the remote location responsive to the control signals; and analyzing at least some, of the signals to formulate at least one parameter indicating the quality of the signals.

Preferably, analyzing the at least some of the signals includes analyzing the at least some of the signals at the base station.

Alternatively, analyzing the at least some of the signals includes analyzing the at least some of the signals at the remote location.

Alternatively, analyzing the at least some of the signals includes analyzing the at least some of the signals at a testing facility remote from the remote location and the base station.

There is further provided, in accordance with a preferred embodiment of the present invention, a method for checking the quality of service provided by a plurality of base stations at a plurality of locations remote from the base stations, including:

transmitting signals between one of the plurality of base stations and a call transceiver at one of the plurality of remote locations;

analyzing at least some of the signals at the remote location to formulate at least one parameter indicating the quality of the signals; and transmitting the at least one parameter from a control transceiver at the one of the remote locations to one of the plurality of base stations.

Preferably, transmitting the signals includes transmitting the signals from a first base station, and transmitting the at least one parameter includes transmitting the at least one parameter to a second base station.

Alternatively, transmitting the signals includes transmitting the signals from a first base station, and transmitting the at least one parameter includes transmitting the at least one parameter to the first base station.

Preferably, transmitting the signals includes initiating signals from a location remote from the plurality of base stations.

Alternatively, initiating the signals includes receiving signals at the location remote from the plurality of base stations.

There is further provided, in accordance with a preferred embodiment of the present invention, a method for checking the quality of service provided by a base station at a location remote from the base station, including:

transmitting control signals to a control transceiver at the remote location;

transmitting signals via the base station between a call transceiver at the remote location and the control transceiver responsive to the control signals; and analyzing at least some of the signals to formulate at least one parameter indicating the quality of the signals.

Preferably, analyzing the at least some of the signals includes analyzing the at least some of the signals at a testing facility remote from the remote location and the base station.

There is further provided, in accordance with a preferred embodiment of the present invention, apparatus for checking the quality of service provided by a base station at a location remote from the base station, including:

a call transceiver and a control transceiver, which communicate over the air with the base station; and a central processing unit, which analyzes signals received by at least one of the transceivers from the base station in order to formulate at least one parameter indicating the quality of the signals, and transmits the parameter to the base station via the other of the transceivers.

Preferably, the transceivers include cellular telephones.

Preferably, the central processing unit analyzes the signals responsive to control signals received by the control transceiver.

Preferably, the apparatus includes a testing facility which receives the parameter from the base station and evaluates a performance of the base station.

The present invention will be more fully understood from the following detailed description of the preferred embodiments thereof, taken together with the drawings in which:

DETAILED DESCRIPTION OF PREFERRED EMBODIMENTS

Figure 1:
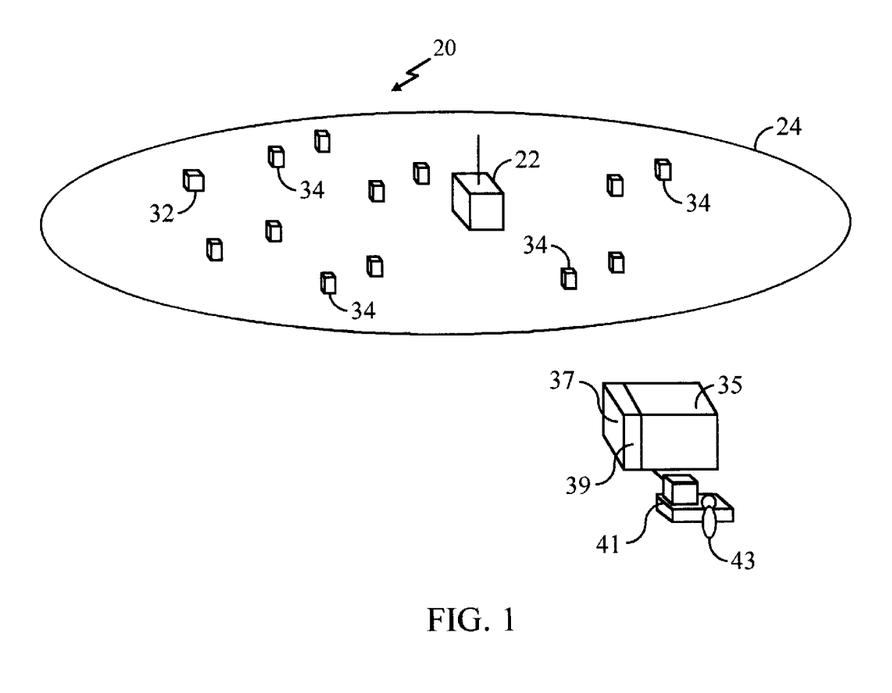
FIG. 1 is a schematic, perspective representation of a wireless communications system, illustrating a general layout of the system, in accordance with a preferred embodiment of the present invention.

Reference is now made to FIG. 1, which schematically illustrates a general layout of a cellular wireless coverage system 20 using a quality of service (QoS) checker unit 32, in accordance with a preferred embodiment of the present invention. System 20 comprises a base station transceiver 22, which transmits signals to and receives signals from cellular telephones 34 in a base station operating region 24.

QoS checker unit 32 is located in region 24, remote from the base station transceiver 22 and operates independently of the base station transceiver 22. Call signals are transmitted between the base station transceiver 22 and the unit 32, and the call signals are analyzed in the unit 32 and/or the base station transceiver 22. Most preferably, results of the analysis, giving one or more measures of the quality of the transmissions between the unit 32 and the base station transceiver 22, are transmitted onward, for example, to a telephone 34 in region 24, to a telephone outside the region, or to a remote testing facility 35. Alternatively, the results are acted upon by the base station transceiver 22. Preferably, remote testing facility 35 comprises a central processing unit 37, operating as a manager 39 for unit 32. Most preferably, manager 39 communicates with unit 32 via an industry-standard protocol such as TCP/IP using IS-707 services. A user 43 is able to communicate with manager 39 via a user interface 41 by, most preferably, using a standard browser utilizing a hypertext transfer protocol (HTTP) and/or a small network management protocol (SNMP). Preferably, the communication between user 43 and manager 39 utilizes an industry-standard network such as the Internet and/or a public service telephone network. Thus, any standard computer station at substantially any point may be used to observe the testing results from unit 32. The detailed operation and construction of checker unit 32, and working modes utilizing and/or reading results provided by the unit 32, are described hereinbelow.

Figure 2:
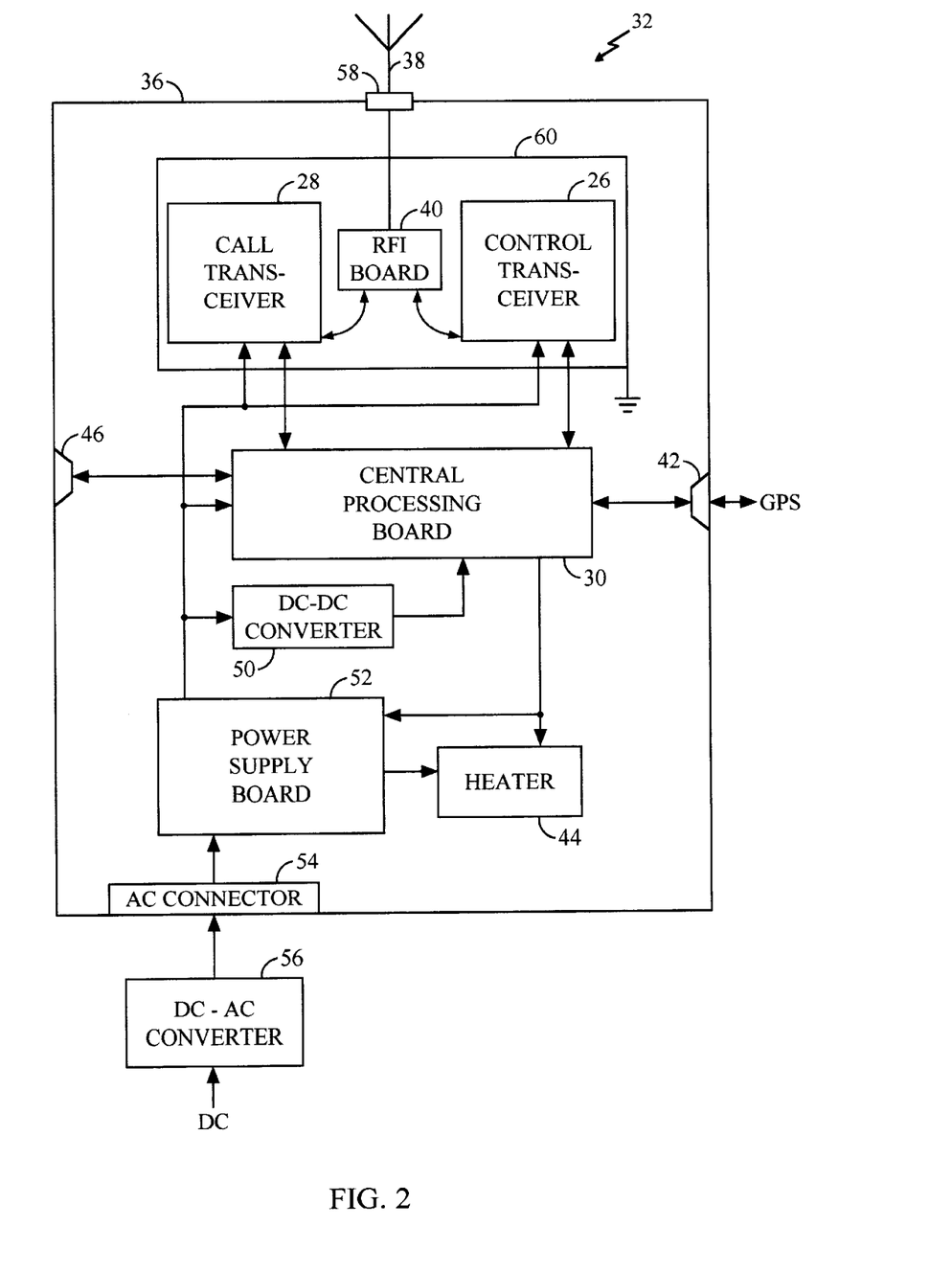
FIG. 2 is a schematic block diagram of a quality of service checker unit for use in the system of FIG. 1, in accordance with a preferred embodiment of the present invention.

FIG. 2 is a schematic block diagram showing the major elements of unit 32, in accordance with a preferred embodiment of the present invention. Most preferably, unit 32 is encased in a weatherproof outer casing 36, and is fixedly mounted thereby to an immobile surface in region 24 (FIG. 1) and receives power from an AC line therein. Alternatively, unit 32 is mounted so as to be able to move, for instance, in or on a vehicle, in which case power is preferably provided via a DC line and a DC-AC converter 56.

Unit 32 comprises a "call" transceiver 28 used to receive and transmit calls, and a "controls" transceiver 26 used to receive and transmit control and information signals. Most preferably, the transceivers 26, 28 are commercially available cellular telephones, with minor modifications as required, operating on 800 MHz or 1900 MHz bands or other industry-standard wavebands, such as two QCM-800 telephones or two QCM-1900 telephones produced by Qualcomm Inc., San Diego, Calif. Transceivers 26 and 28 are coupled to an antenna 38 via a radiofrequency interface board (RIB) 40 and an antenna connector 58. Most preferably, electromagnetic interference between the transceivers and the remainder of unit 32 is minimized by shielding the transceivers using a grounded metallic plate 60.

The operation of transceivers 26 and 28 is controlled via a central processing board 30, which also receives signals from the transceivers. Board 30 communicates with and receives data and control signals from base station 22 (FIG. 1) over the air via control transceiver 26. Board 30 may also receive data and control signals directly via a connector 46, mounted on casing 36, which method is most preferably used for initial setup of unit 32. Optionally, board 30 also communicates via a connector 42 with a global positioning system (GPS), as is known in the art, which is most preferably utilized when unit 32 is mobile in the region being checked.

Regulated DC power to transceivers 26 and 28, and to board 30, is supplied from a power supply board 52 and a DC-DC converter 50. Power supply board 52 also powers, via a thermostatic control, a heater 44 which is used to maintain the Absent temperature of unit 32 above its minimum operating temperature, typically 0° C. Power supply board 52 is driven by a line source external to unit 32, via an AC connector 54 Alternatively, board 52 is driven by an external DC source, via external DC-AC converter 56. Power supply board 52 preferably comprises protection devices at its input, such as current surge protectors and under-voltage and over-voltage limiters, as are known in the art.

Figure 3:
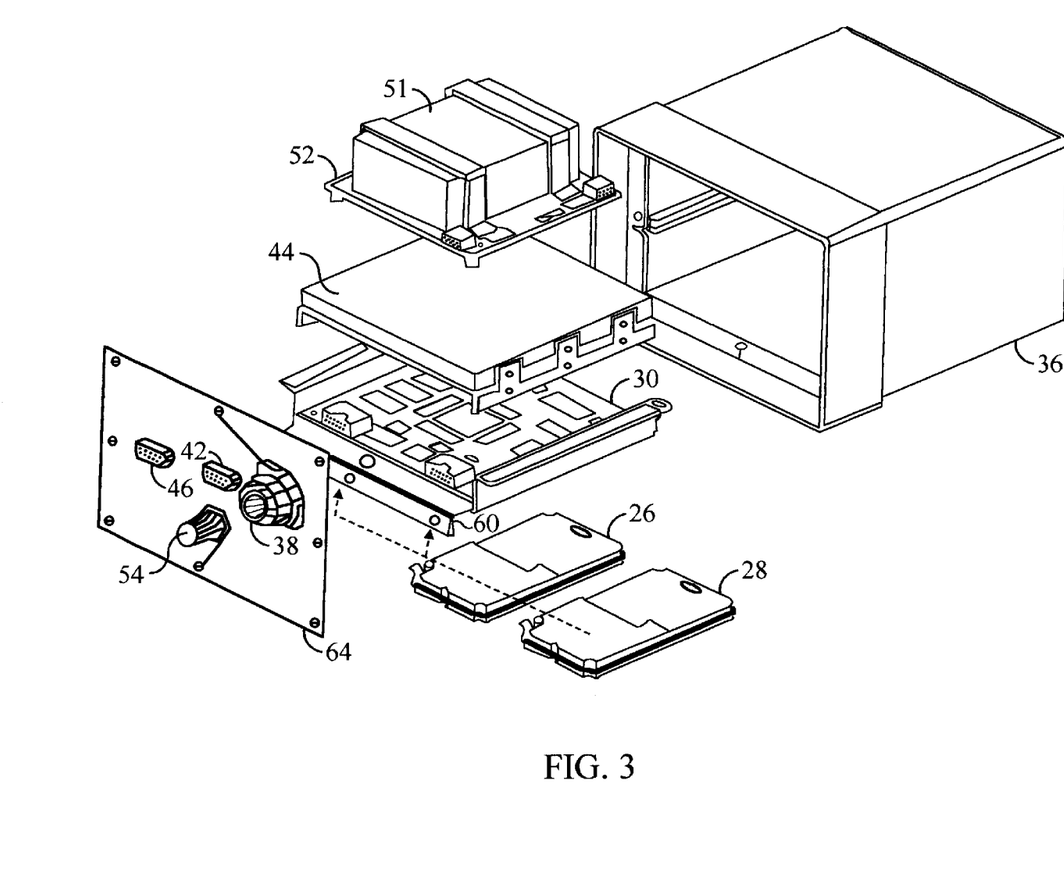
FIG. 3 is an isometric, exploded diagram, showing the physical layout and positioning of some of the major elements of the unit of FIG. 2, in accordance with a preferred embodiment of the present invention.

FIG. 3 is an isometric, exploded diagram of unit 32, showing the physical layout and positioning of some of the major elements referred to with reference to FIG. 2, in accordance with a preferred embodiment of the present invention. Elements which are substantively identical in FIG. 2 and FIG. 3 hare identical numbers. Transceivers 26 and 28 are mounted on one side of shield 60, which has central processing board 30 mounted on its other side. Heater 44 is fixedly positioned over board 30 so that it is electrically insulated from, but in good thermal contact with, the board. A power supply 51 is mounted onto power supply board 52, which is then mounted over heater 44. During assembly of unit 32, connectors 42, 46, 54, and 58 are fixedly located in a connector panel 64, and are coupled as described above to their respective boards, after which connector panel 64 is affixed to casing 36.

Figure 4:
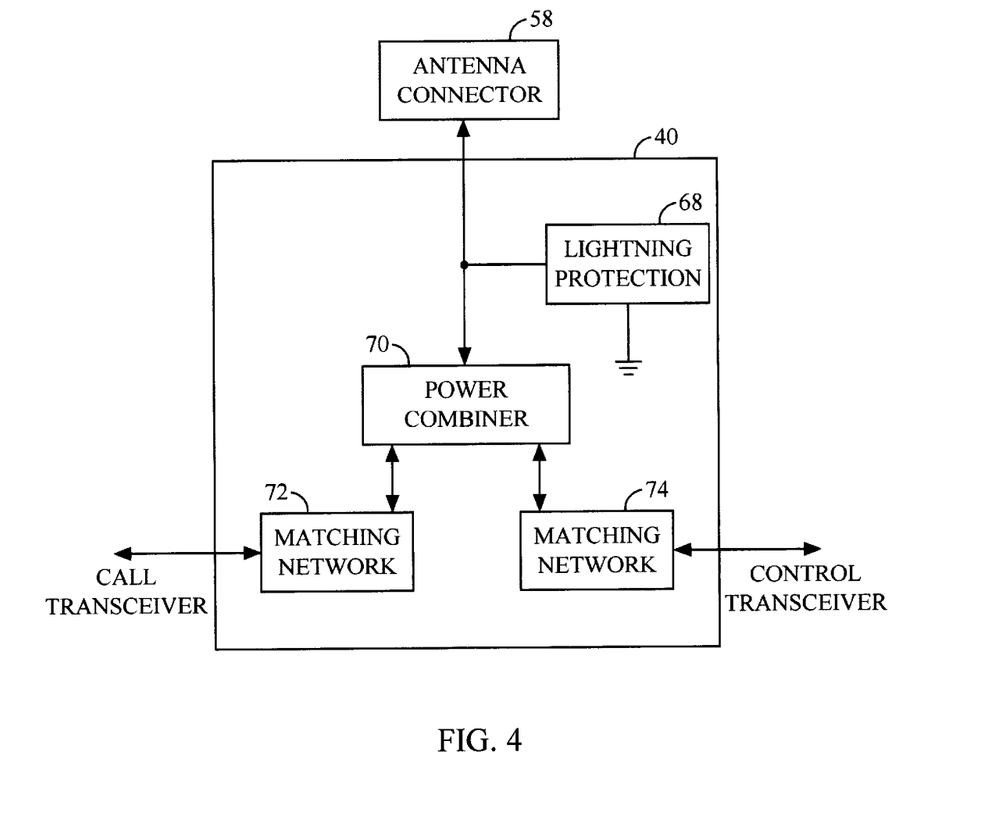
FIG. 4 is a schematic block diagram of a radiofrequency interface board in the unit of FIG. 2, in accordance with a preferred embodiment of the present invention.

FIG. 4 is a schematic block diagram of radiofrequency interface board 40, shown as a single block in FIG. 2, in accordance with a preferred embodiment of the present invention. Board 40 comprises matching networks 72 and 74, which are coupled to respective RF inputs of transceivers 26 and 28. A power combiner 70, fist preferably a Willkinson power Combiner, as is known in the art, couples the matching networks to the antenna. A lightning protection device 68, most preferably a λ/4 50Ω stub, as is known in the art, is connected to the antenna side of the combiner.

Figure 5:
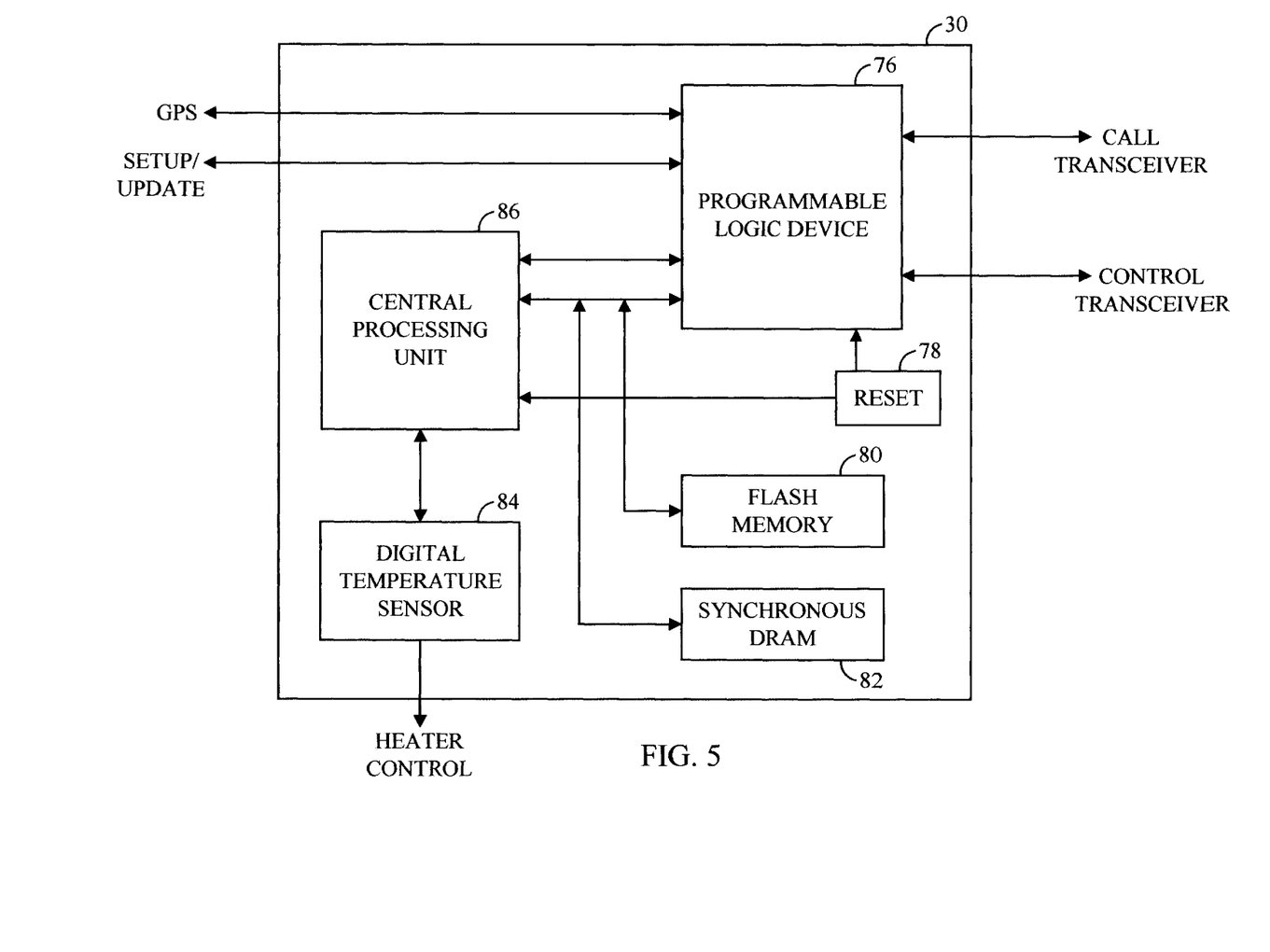
FIG. 5 is a schematic block diagram of a central processing board in the unit of FIG. 2, in accordance with a preferred embodiment of the present invention.

FIG. 5 is a schematic block diagram of central processing board 30, shown in FIG. 2, in accordance with a preferred embodiment of the present invention. A central processing unit (CPU) 86, for example, an MPC860 PowerPC core microprocessor produced by Motorola SPS Inc., of Phoenix, Ariz., communicates with and controls the other components of unit 32, and determines the working ode used by the unit. The CPU communicates with the other components via a programmable logic device 76, for example, a 7128A-10 CPLD produced by Altera Corporation, of San Jose, Calif. The CPU also reads data from and can write data to a non-volatile flash memory 80 and a volatile synchronous DRAM memory (SDRAM) 82. Examples of working modes of unit 32 are given hereinbelow.

Preferably, code to run CPU 86 is stored in memory 60, and during system startup the code is transferred by CPU 86 to SDRAM 82, from which the processor reads its code during operation. The code stored in memory 80 may be updated, for example if a new or different working mode is required, via setup/update connector 46 (FIG. 2), or over the air. Most preferably, SDRAM 82 is also used to store data gathered by unit 32, and this data may also be transferred to flash memory 80. Code for storage within call transceiver 28 or control transceiver 26 may also be transferred when required, under control of CPU 86, via connector 46 or over the air.

Board 30 further comprises a reset control 79, and a digital temperature sensor 84. Reset control 78, for example an MAX706TCUA, produced by Maxim Integrated Products of Sunnyvale, Calif., operates at power-up, by deactivating a reset signal to components controlled by controller 76 when the supply voltage is within a predetermined range. Temperature sensor 84, for example an LM75 produced by National Semiconductor Corporation of Santa Clara, Calif., is used by CPU 86 as a thermostatic control to determine when power to the heater should be supplied, in order to maintain the temperature of unit 32 above its minimum operating temperature and within a predefined range.

Figure 6:
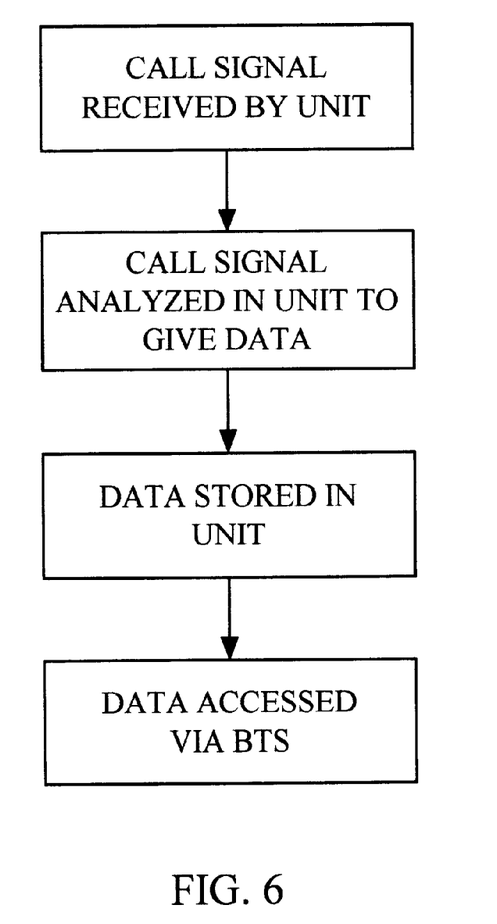
FIG. 6 is a flowchart schematically illustrating an operational mode of the unit of FIG. 2, according to a preferred embodiment of the present invention.

Reference is now made to FIG. 6, which is a flowchart that schematically illustrates an operational mode of unit 32, according to a preferred embodiment of the present invention. A call signal is received by call transceiver 28 of unit 32. The call signal may be a call directed to transceiver 28 via base station 22, or another radiofrequency signal, such as a pilot signal from the base station, received by transceiver 28. Preferably, the call signal is analyzed by unit 32 according to software preprogrammed into the unit, and the analyzed data is stored within the unit. Most preferably, operator 43 or manager 39 (FIG. 1) in remote testing facility 35, accesses the analyzed data via control transceiver 26 to determine one or more QoS parameters for base station 22. The analyzed data may also be accumulated over a period of time and stored as a historical data record within memory 80 or DRAM 82 (FIG. 5) of unit 32, for access as required by operator 43 or manager 39. Examples of parameters that may be determined are signal strength, frame error rake, and statistics on dropped calls. It will be understood that the receiving of call signals using the call transceiver 28 and the access to data using the control transceiver 26 are Substantially independent of each other. Thus operator 43 or manager 39 may access substantially real-time analysis data and/or a historical data record from unit 32 while call transceiver 28 is continuing to receive call signals.

Figures 7A, 7B:
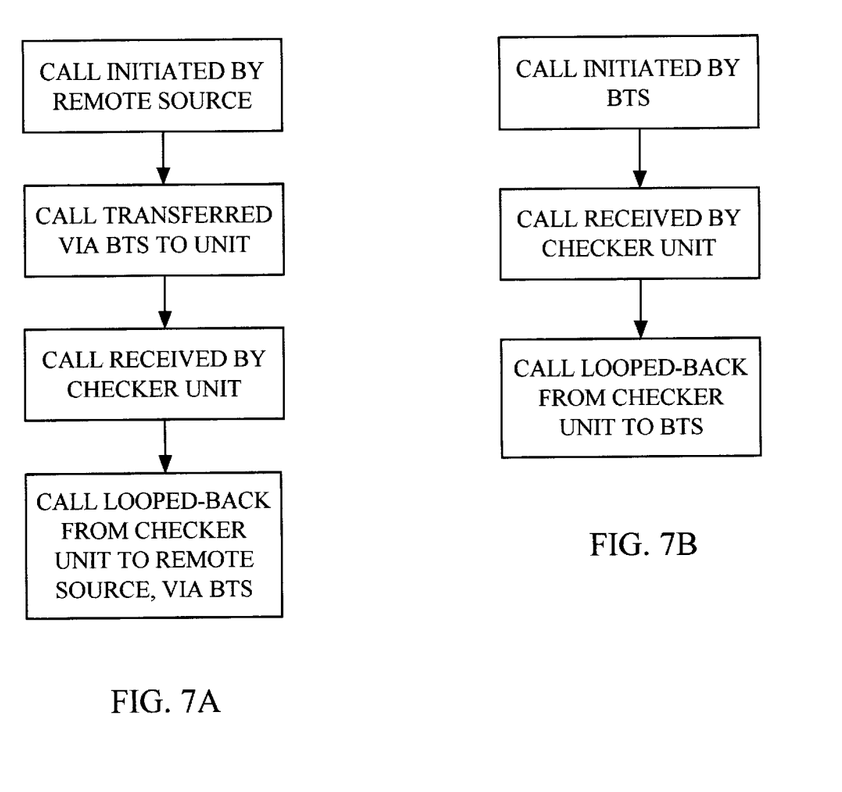
FIG. 7A and FIG. 7B are flowcharts schematically illustrating "loop-back" operational modes of the unit of FIG. 2, according to a preferred embodiment of the present invention.

FIG. 7A and FIG. 7B are flowcharts that schematically illustrate "loop-back" operational modes of unit 32, according to a preferred embodiment of the present invention. In a loop-back mode, unit 32 receives a call and automatically returns the call, and/or data measuring the call, to the originator of the call. FIG. 7A shows the steps involved when a call originates from a source remote from base station 22, for example from operator 43 or manager 39. The call is transferred via base station 22 to call transceiver 28 of unit 32, and the call is then looped back (via the base station ) to the originator of the call. Unit 32 and/or the remote source are able to analyze the call substantially in real-time to determine one or more QoS parameters for the base station, according to software preprogrammed into the unit and the remote source. In the event that unit 32 analyzes the call, the analysis may be accessed by the call originator via control transceiver 26 of unit 32.

FIG. 7B shows the steps involved when base station 22 originates a call, for example, according to software preprogrammed into the base station. The call is received by call transceiver 28 of unit 32, and the unit then loops the call back to base station 22. Unit 32 and/or base station 22 analyze the call, as described above with reference to FIG. 7A, according to software preprogrammed into the unit and the base station The mode of operation illustrated by FIG. 7B is typically used by the base station to perform self-testing functions. The modes of operation illustrated by FIGS. 7A and 7B are typically used when digital call signals such as Markov calls, described in more detail hereinbelow, are looped back.

A Markov call is a loop-back CDMA call wherein an originator sends a predefined sequence of bits according to a predetermined algorithm to a receiver, and the receiver returns the sequence of bits to the originator. As is known in the art, comparison of the received bits with the original sequence enables either the originator or the receiver to make an objective determination of the quality of the transmission. Most preferably, the software loaded into call originators and unit 32 enables receipt and analysis of Markov calls, so that objective analyses of transmission quality can be made.

Figure 8A:
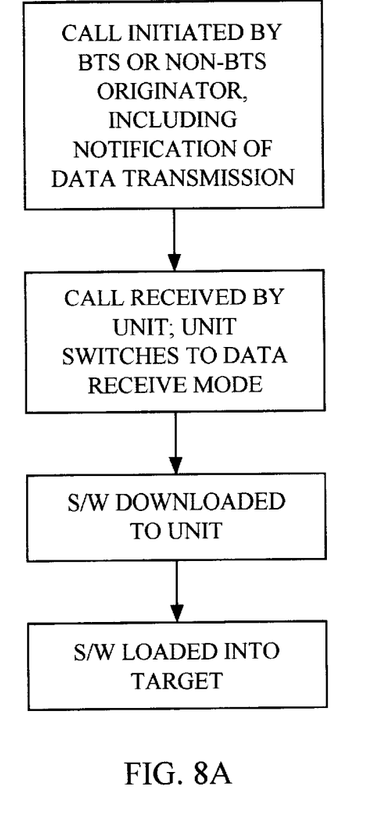
FIGS. 8A and 8B are flowcharts schematically illustrating data transfer operational modes of the unit of FIG. 2, according to a preferred embodiment of the present invention.
Figure 8B:
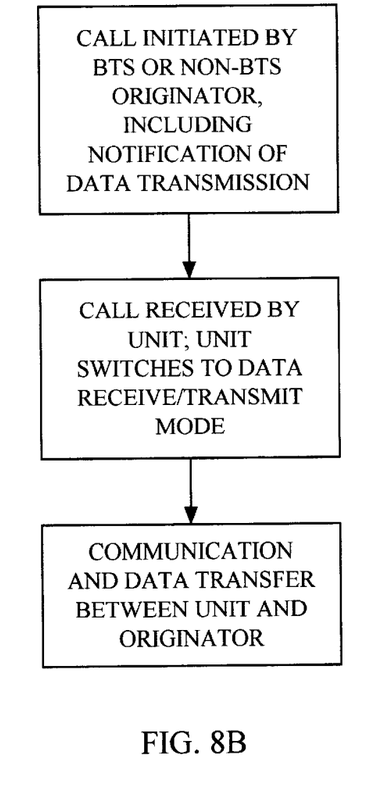

FIGS. 8A and 8B are flowcharts that schematically illustrate data transfer operational modes of unit 32, according to a preferred embodiment of the present invention. FIG. 8A shows steps involved in a one-way data transfer to unit 32. The steps illustrate a method of downloading software code (S/W) over the air from a system external to unit 32 into a target within the unit. The target may be flash memory 80 (FIG. 5), for example when software controlling unit 32 is to be upgraded, or memory within call transceiver 28 or control transceiver 26 of unit 32. As shown in FIG. 8A and FIG. 5, the initiating call has a notification of data transmission embedded in the call, which is conveyed via logic device 76 to CPU 86. When the call is received by unit 32, CPU 86 instructs elements of unit 32 to switch to a data receive mode, in which the data are most preferably received utilizing control transceiver 26. The software code to be transferred is first downloaded via transceiver 26, logic device 76, and CPU 86, to synchronous DRAM 82. Depending on the final target for the software, the downloaded software is transferred to an appropriate memory in the call or control transceiver or to flash memory 80. FIG. 8B shows the steps involved in a two-way data communication with unit 32, for example if one of the analysis parameters stored in the flash memory of unit 32 is to be checked. After receiving an initiating call, unit 32 switches to a receive/transmit mode, most preferably utilizing control transceiver 26. Requests for data values are then transmitted to unit 32, and the values are returned by unit 32 to the call originator, according to predefined software present in the call originator and present in the unit.

Figure 9:
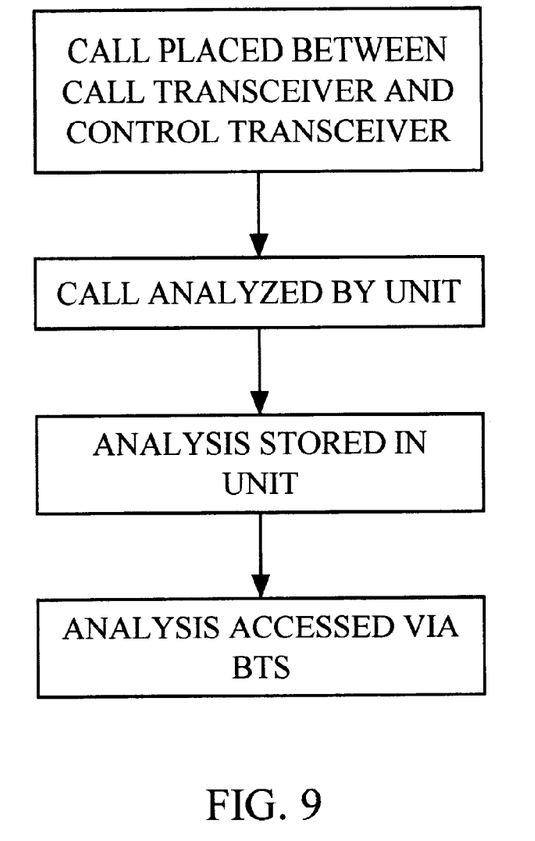
FIG. 9 is a flowchart schematically illustrating an alternative operational mode of the unit of FIG. 2, according to a preferred embodiment of the present invention.

FIG. 9 is a flowchart that schematically illustrates communication between call transceiver 28 and control transceiver 26 of unit 32, according to a preferred embodiment of the present invention. A call, is placed by call transceiver 28 to control transceiver 26, via base station 22. Preferably, the call is placed according to software preprogrammed into unit 32. Alternatively, the call is placed in response to signals from operator 43 or manager 39. The call is analyzed by unit 32, and data from the analysis is stored in unit 32, for access as described hereinabove with reference to FIG. 6. The made of operation illustrated by FIG. 9 is typically used when loop-back tests are to be performed without the involvement of a remote call termination, or when a network load is to be created during a load test.

Figure 10:
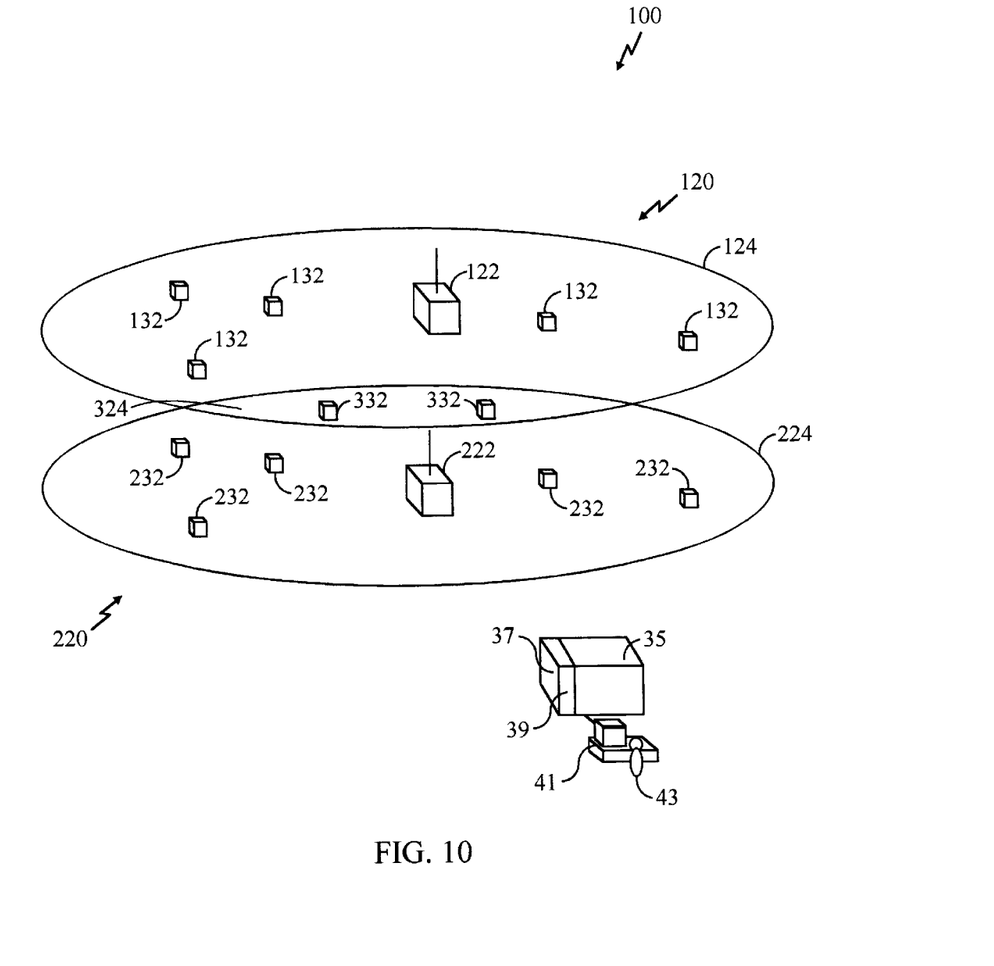
FIG. 10 is a schematic, perspective representation of a wireless communications network, illustrating a general layout of the network comprising a plurality of checker Units, according to a preferred embodiment of the present invention.

FIG. 10 schematically illustrates a general layout of a cellular wireless coverage network 100, using a plurality of QoS units 132, a plurality of QoS units 232, and a plurality of QoS units 332, in accordance with a preferred embodiment of the present invention. The internal operation and construction of units 132, 232, and 332, are substantially the same as those of unit 32 (FIGS. 1, 2, 3, 4, and 5), and the different numerals are used in the following description to differentiate the positions of the pluralities of units within network 100. While the description below of network 100 refers to two wireless coverage systems within the network, network 100 may be composed of any whole number of wireless coverage systems.

Network 100 comprises a first cellular wireless coverage system 11o having a base station 122 communicating to a region 124, and a second cellular wireless coverage system 220, having a base station 222 communicating to a region 224. A region 324 is the region where region 124 and region 224 overlap. Units 132, which are located in region 124 but not in region 324, communicate with base station 122. Units 232, which are located in region 224 but not in region 324, communicate with base station 222 Units 332, which are located in region 324, may communicate with base station 122 and/or base station 222. Each of the plurality of units 132, 232, and 332, is fixedly positioned, or is mobile in network 100, at a location remote from base stations 122 and 222, as described hereinabove for system 20 (FIG. 1).

Network 100 further comprises testing facility 35, comprising central processing unit 37, manager 39, user interface 41, and user 43, which is able to communicate with each of units 132, 232, or 332, as described above for system 20 (FIG. 1). Thus manager 39 and/or user 43 are able to communicate directly with each unit in network 100. For example, manager 39 and/or user 43 may communicate with a preselected number of units in a specific region of network 100 in a time-slice manner. This mode of operation is useful when manager 39 and/or user 43 want to assess base station operation and QoS in a specific region.

Figure 11:
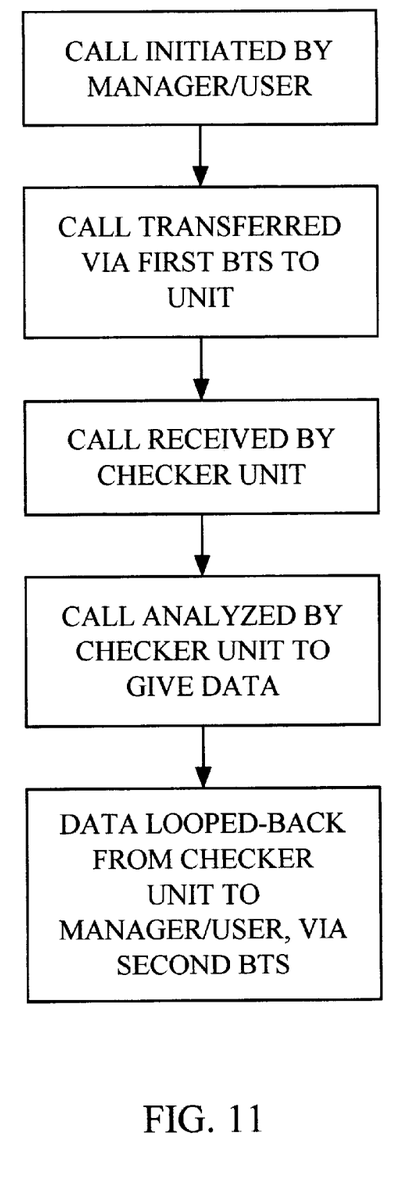
FIG. 11 is a flowchart schematically illustrating a "circular" loop-back operational mode of one of the units of FIG. 10, according to a preferred embodiment of the present invention.

Reference is now made to FIG. 11, which is a flowchart that schematically illustrates a "circular" loop-back operational mode with one of the plurality of units 332, according to a preferred embodiment of the present invention. In a circular loop-back mode, one of the plurality of units 332 receives a call via a first base station and automatically returns the call, and/or data measuring the call, to the originator of the call via a second base station. Manager 39 and/or user 43 initiate a call via one of the base stations to one of the plurality of units 332, and 11 the call is received by the call transceiver of the unit 332, wherein the call is analyzed. Data from the analysis is looped back from the control transceiver of the unit to manager 39 and/or user 43, via the other of the base stations. Thus the forward and return paths of the loop are via different base stations. Circular loop-back modes of operation as described above significantly improve the ability of a manager or user to determine the QoS of a system, for example, when communication via one base station is difficult because of a weak signal. It will be appreciated that circular loop-back modes of operation are only feasible when there are two transceivers in the checking unit.

It will thus be appreciated that the use of two transceivers in the checking unit substantially increases the flexibility and efficacy of the unit in terms of measuring the quality of transmission from a base station to a cellular telephone, compared to units having only one transceiver. It will also be appreciated that other methods of checking apart from those specifically described hereinabove, utilizing two transceivers in a unit, may be used. All such methods are to be considered within the scope of the present invention.

It will be further appreciated that the preferred embodiments described above are cited by way of, example, and the full scope of the invention is limited only by the claims.

What is claimed is:

1. A method for checking the quality of service provided by a base station at a location remote from the base station, comprising:
   transmitting signals between the base station and a call transceiver at the remote location;
   analyzing at least some of the signals at the remote location to formulate at least one parameter indicating the quality of the signals; and
   transmitting the at least one parameter from a control transceiver at the remote location to the base station concurrent with the transmission of at least some of the signals transmitted from the call transceiver.

2. A method according to claim 1, wherein transmitting the signals comprises transmitting call signals to the transceiver and returning the call signals from the transceiver.

3. A method according to claim 1, wherein transmitting signals comprises transmitting digital signals.

4. A method according to claim 1, and comprising transmitting control signals to the control transceiver, and wherein transmitting signals between the base station and the call transceiver comprises transmitting the signals responsive to the control signals.

5. A method according to claim 4, wherein transmitting control signals comprises downloading control software to the control transceiver.

6. A method according to claim 1, wherein transmitting the signals comprises initiating signals from a testing facility which is remote from the base station and the remote location.

7. A method according to claim 6, wherein initiating the signals comprises receiving signals at the testing facility.

8. A method for checking the quality of service provided by a plurality of base stations at a plurality of locations remote from the base stations, comprising:
   transmitting signals between one of the plurality of base stations and a call transceiver at one of the plurality of remote locations;
   analyzing at least some of the signals at the remote location to formulate at least one parameter indicating the quality of the signals; and transmitting the at least one parameter from a control transceiver at the one of the remote locations to one of the plurality of base stations concurrent with the transmission of at least some of the signals transmitted from the call transceiver.

9. A method according to claim 8, wherein transmitting the signals comprises transmitting the signals from a first base station, and transmitting the at least one parameter comprises transmitting the at least one parameter to a second base station.

10. A method according to claim 8, wherein transmitting the signals comprises transmitting the signals from a first base station, and transmitting the at least one parameter comprises transmitting the at least one parameter to the first base station.

11. A method according to claim 10, wherein transmitting the signals comprises initiating signals from a location remote from the plurality of base stations.

12. A method according to claim 11, wherein initiating the signals comprises receiving signals at the location remote from the plurality of base stations.

13. A method for checking the quality of service provided by a base station at a location remote from the base station, comprising:

transmitting control signals to a control transceiver at the remote location;

transmitting signals via the base station between a call transceiver at the remote location and the control transceiver responsive to the control signals, transmissions from the remote location being made by the control transceiver concurrent with the transmission of at least some of the signals transmitted from the call transceiver; and analyzing at least some of the signals to formulate at least one parameter indicating the quality of the signals.

14. A method according to claim 13, wherein analyzing the at least some of the signals comprises analyzing the at least some of the signals at a testing facility remote from the remote location and the base station.

15. Apparatus for checking the quality of service provided by a base station at a location remote from the base station, comprising:

a call transceiver and a control transceiver capable of transmitting concurrently, which communicate over the air with the base station; and a central processing unit, which analyzes signals received by at least one of the transceivers from the base station in order to formulate at least one parameter indicating the quality of the signals, and transmits the parameter to the base station via the other of the transceivers.

16. Apparatus according to claim 15, wherein the transceivers comprise cellular telephones.

17. Apparatus according to claim 15, wherein the central processing unit analyzes the signals responsive to control signals received by the control transceiver.

18. Apparatus according to claim 15, and comprising a testing facility which receives the parameter from the base station and evaluates a performance of the base station.

\* \* \* \* \*